Figure 2:
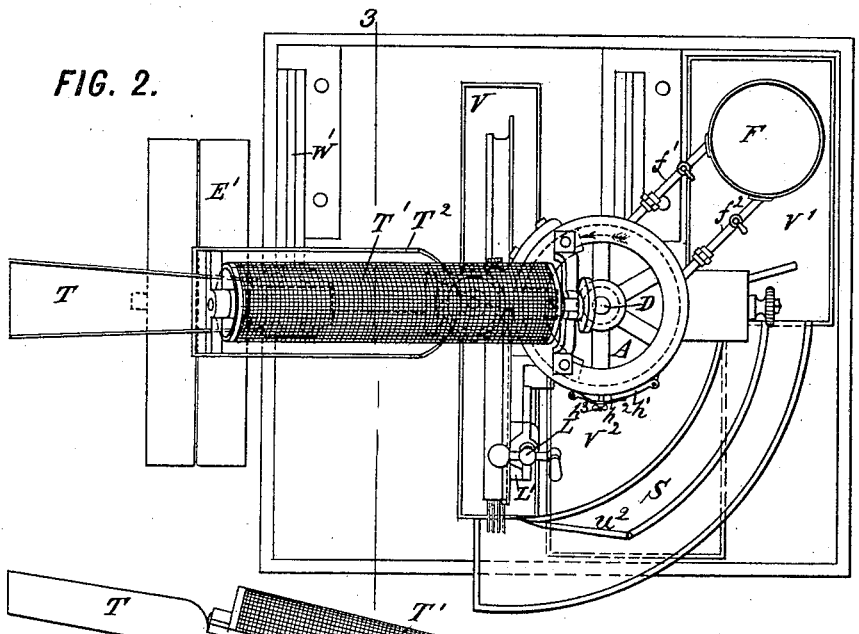

(No Model.) 7 Sheets—Sheet 1.

C. A. WELLER.
PILL MACHINE.

No. 467,071. Patented Jan. 12, 1892.

WITNESSES:
John Becker
Fred White

INVENTOR:
Chester A. Weller,
By his Attorneys,
Arthur C. Fraser & Co.

(No Model.)

C. A. WELLER.
PILL MACHINE.

No. 467,071.

7 Sheets—Sheet 2.

Patented Jan. 12, 1892.

WITNESSES:
John Becker
Fred White

INVENTOR:
Chester A. Weller.
By his Attorneys,
Arthur C. Fraser & Co.

(No Model.) 7 Sheets—Sheet 4.
C. A. WELLER.
PILL MACHINE.

No. 467,071. Patented Jan. 12, 1892.

WITNESSES:
John Becher
Fred White

INVENTOR:
Chester A. Weller,
By his Attorneys,
Arthur E. Fraser & Co.

(No Model.) 7 Sheets—Sheet 5.

C. A. WELLER.
PILL MACHINE.

No. 467,071. Patented Jan. 12, 1892.

WITNESSES:
John Becker
Fred White

INVENTOR:
Chester A. Weller,
By his Attorneys,
Arthur C. Fraser & Co.

(No Model.) 7 Sheets—Sheet 6.
C. A. WELLER.
PILL MACHINE.
No. 467,071. Patented Jan. 12, 1892.
FIG. 7.
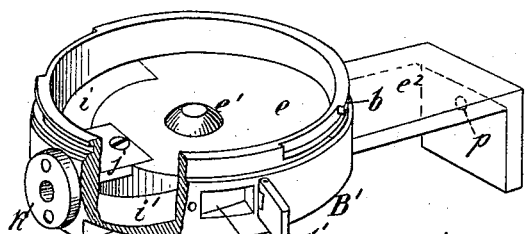
FIG. 15.
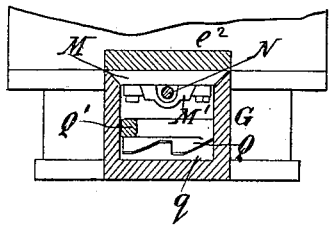
FIG. 14.
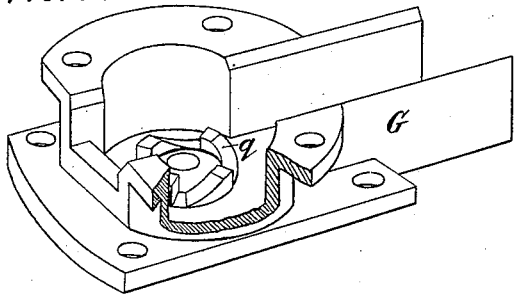
FIG. 12.
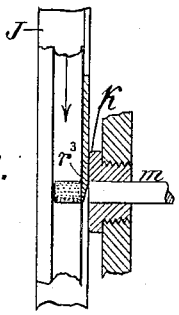
FIG. 8.
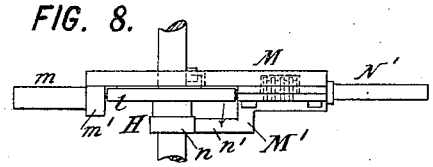
FIG. 9.
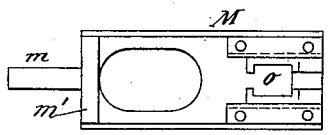
FIG. 10.
FIG. 11.
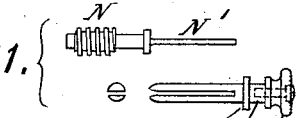
FIG. 13.
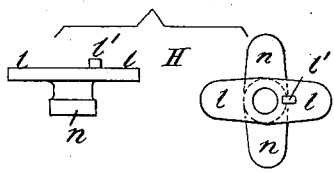
FIG. 16.
FIG. 17.
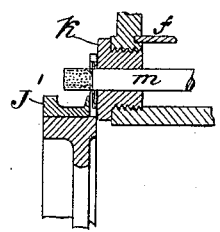
INVENTOR:
Chester A. Weller,
By his Attorneys, (No Model.) 7 Sheets—Sheet 7.

C. A. WELLER.
PILL MACHINE.

No. 467,071. Patented Jan. 12, 1892.

WITNESSES:
John Becker
Fred White

INVENTOR:
Chester A. Weller,
By his Attorneys,
Arthur E. Draper

UNITED STATES PATENT OFFICE.

CHESTER A. WELLER, OF OSSINING, NEW YORK, ASSIGNOR OF ONE-HALF TO JOHN GIBNEY, OF SAME PLACE.

PILL-MACHINE.

SPECIFICATION forming part of Letters Patent No. 467,071, dated January 12, 1892.

Application filed May 18, 1891. Serial No. 393,087. (No model.)

*To all whom it may concern:*

Be it known that I, CHESTER A. WELLER, a citizen of the United States, residing at Ossining, in the county of Westchester and State of New York, have invented certain new and useful Improvements in Pill-Machines, of which the following is a specification.

My invention provides an improved machine for mixing or incorporating plastic substances in the nature of medicinal compounds, and for forming them into pills, pellets, or tablets.

My invention aims to produce a machine which shall be adapted to the handling of a great variety of substances under varying conditions, and which shall be capable of adjustment to suit the varying requirements of the substances to be manipulated and capable of rapid operation, to turn out pills, tablets, or cakes in great quantities and with a minimum expense.

My improved machine comprises a mixer or mill for thoroughly commingling the ingredients of the compound and forming them into a paste of the desired consistency, means for ejecting a measured quantity of the paste through a die, the quantity so ejected being variable by adjustment made during the running of the machine, and means for shaping the material forced from the die into spherical form.

It also comprises means for applying a powder or sugar coating to the exterior of the pills and means for sorting the finished pills to separate out any imperfect ones.

My machine may be best understood by referring to the accompanying drawings, wherein—

Figure 1:
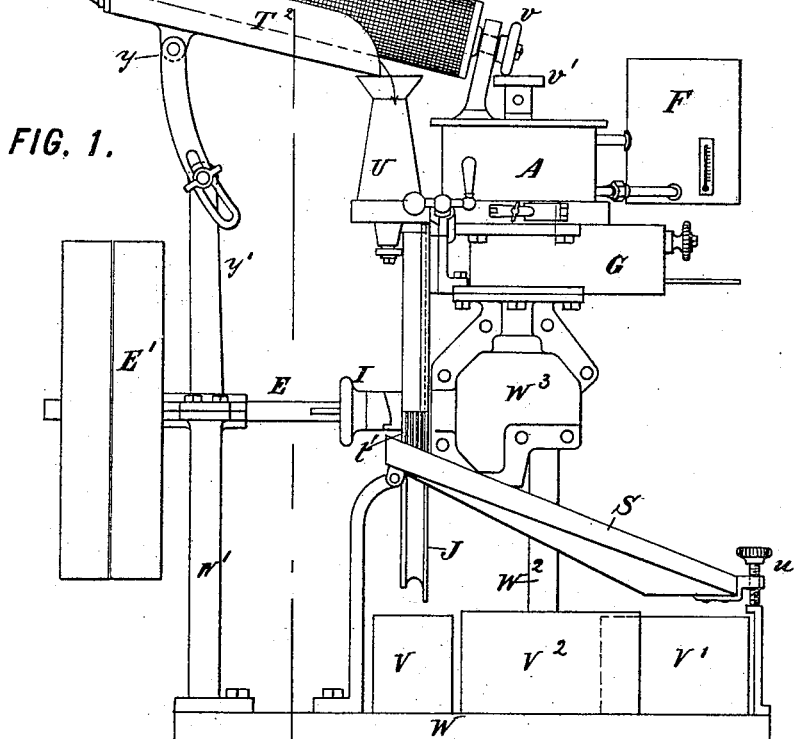
Figure 3:
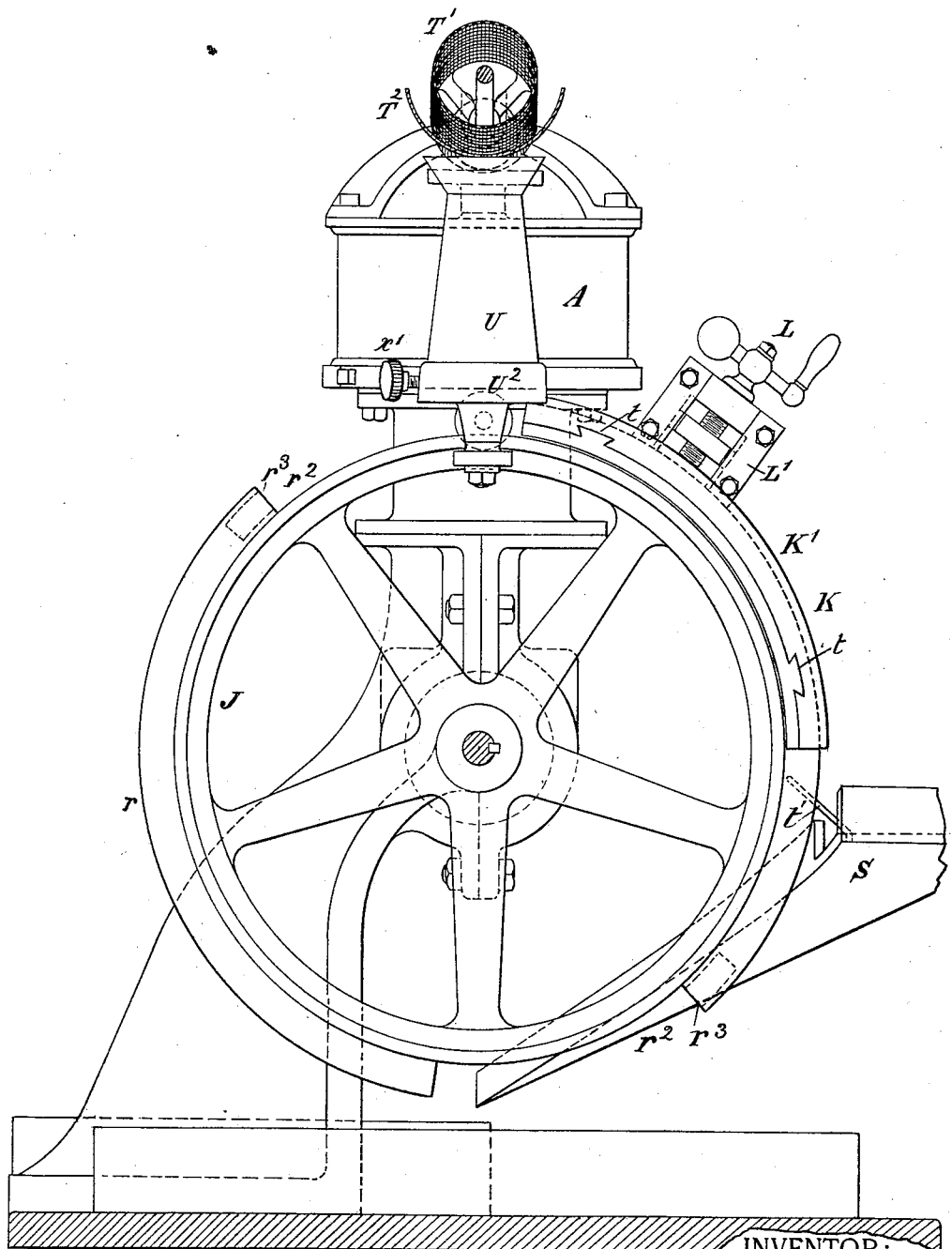
Figure 4:
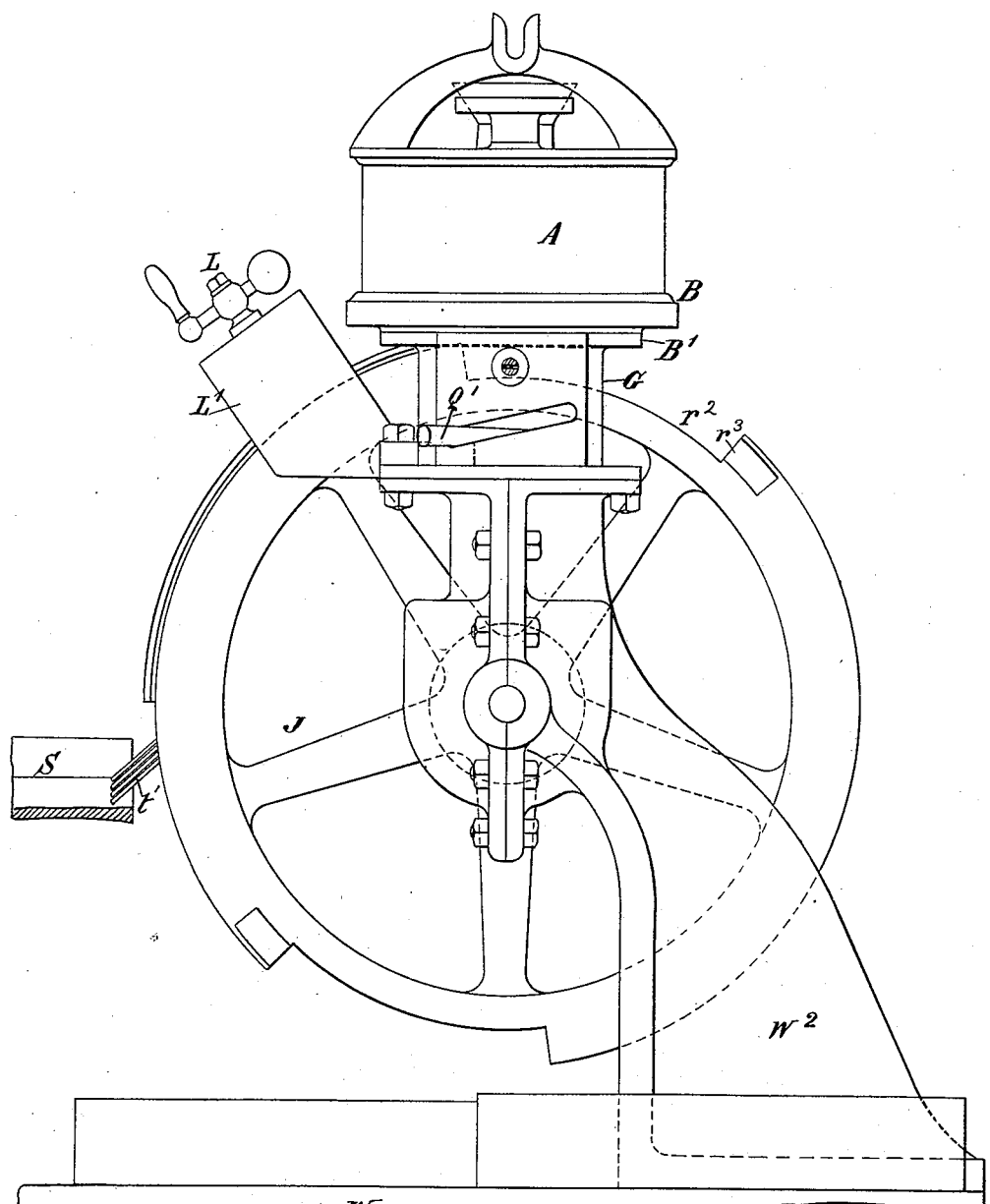
Figure 5:
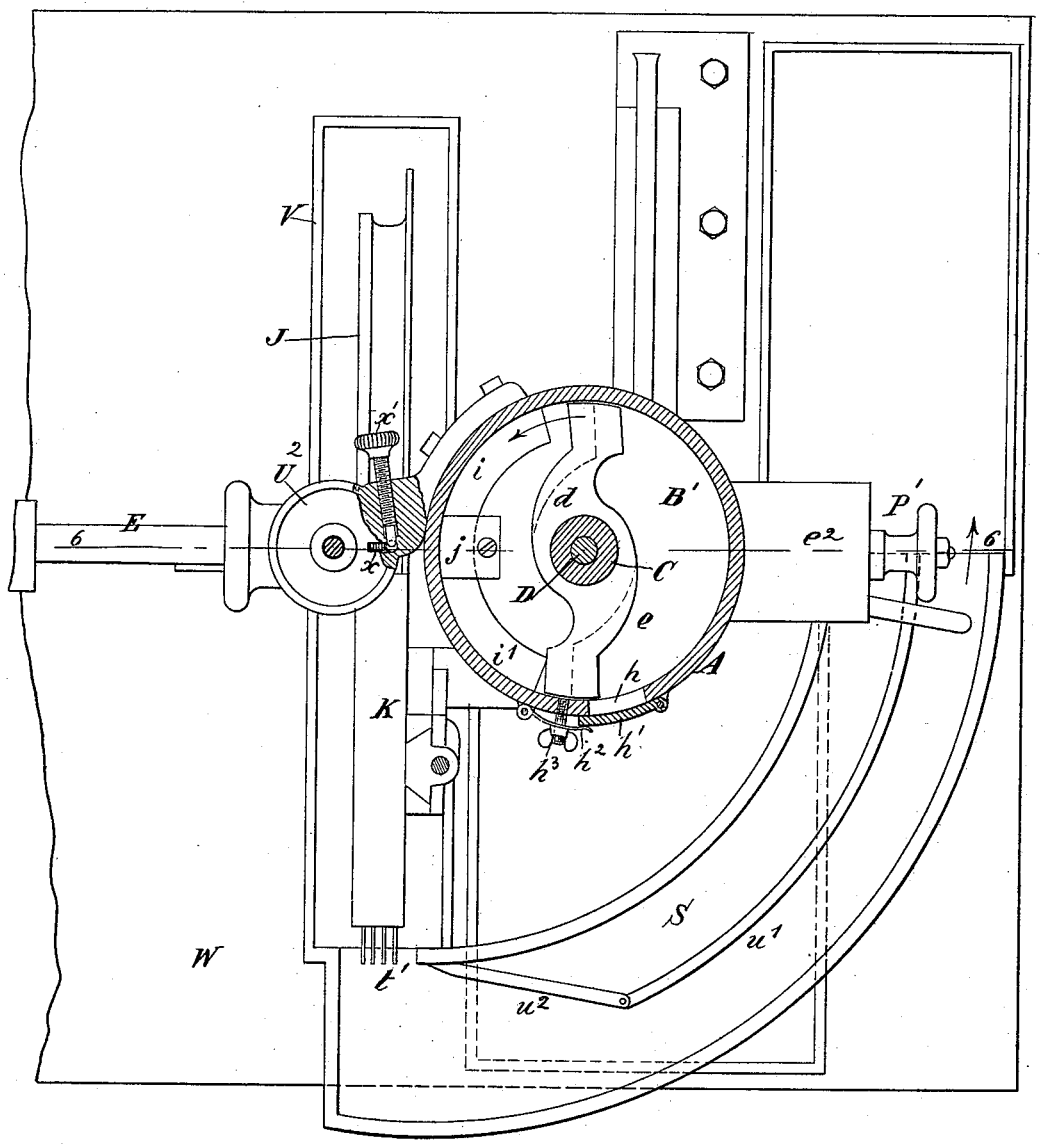
Figure 6:
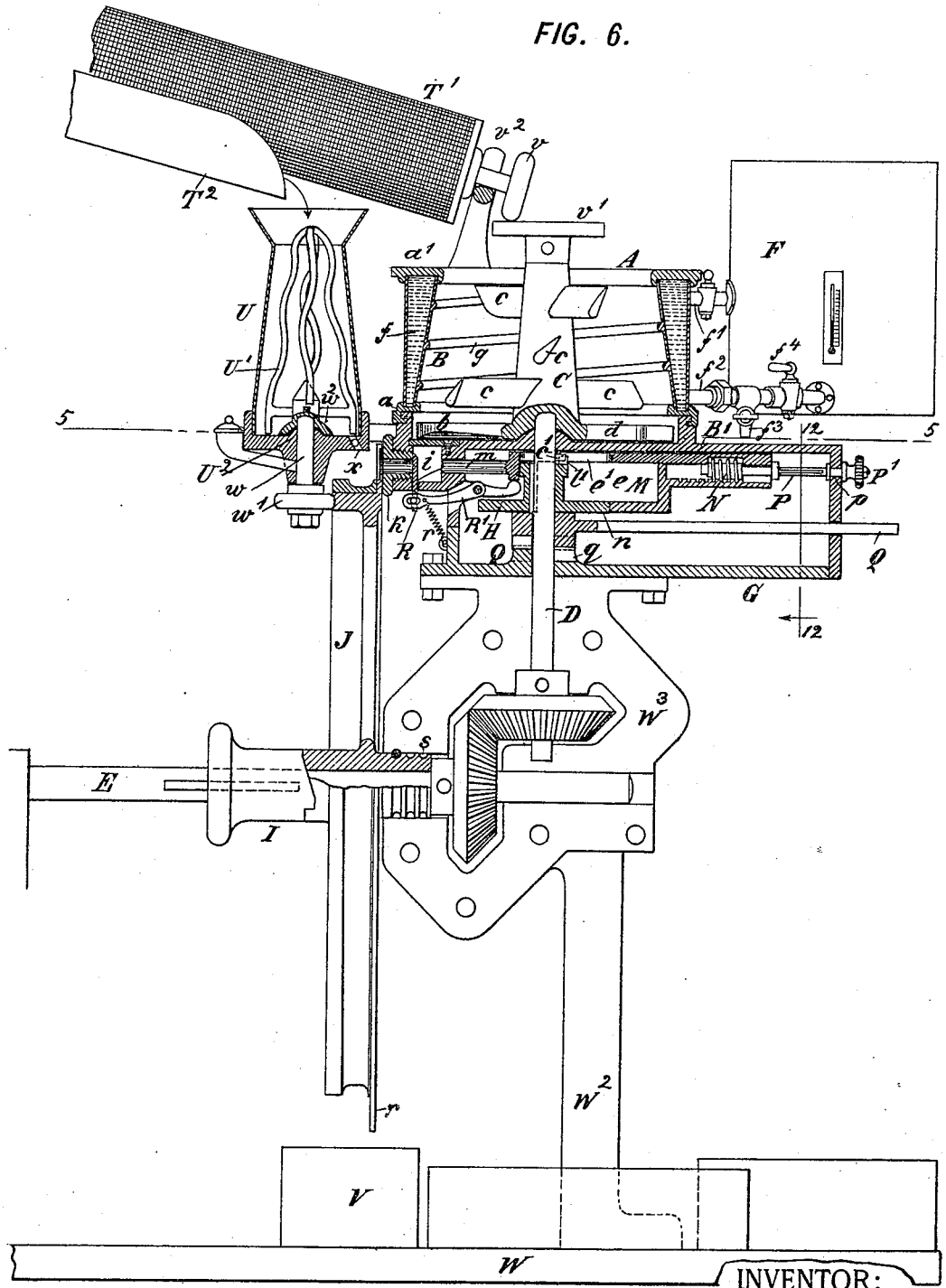
Figure 18:
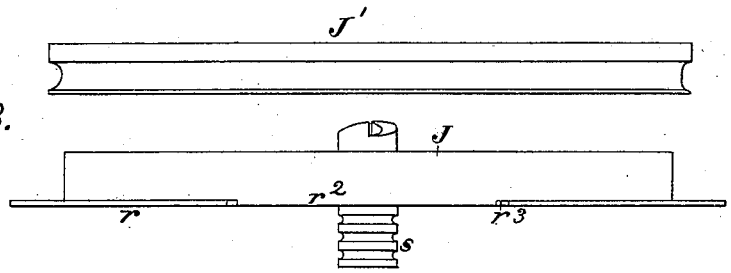
Figure 19:
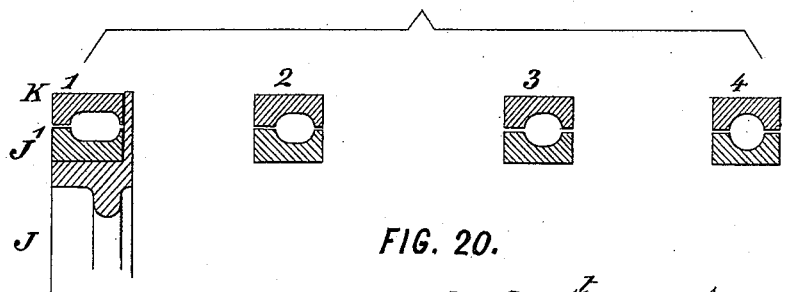
Figure 20:
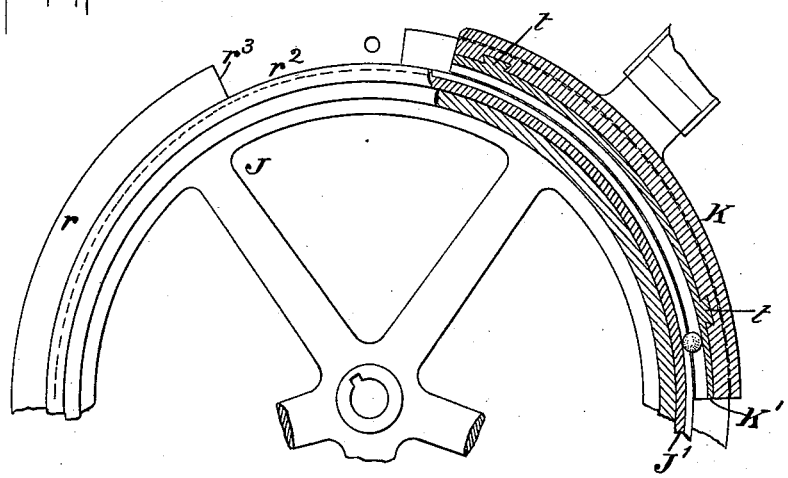
Figure 21:
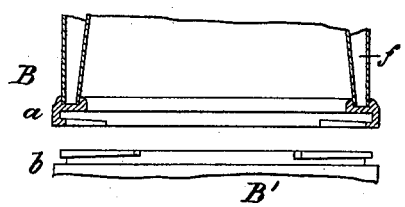

Figure 1 is a front elevation of the machine. Fig. 2 is a plan thereof. Fig. 3 is an elevation on a larger scale viewed from the left, the view being partly in vertical section on the line 3 3 in Figs. 1 and 2. Fig 4 is a similar elevation, looking in the opposite direction to Fig. 3. Fig. 5 is a horizontal section on the line 5 5 in Fig. 6. Fig. 6 is a vertical transverse section on the line 6 6 in Fig. 5. Fig. 7 is a perspective view of the bottom portion of the mixer-chamber, partly broken away. Fig. 8 is a side elevation of the punch-carrying slide, auxiliary slide, and adjusting-screw. Fig. 9 is an under side plan of the punch-carrying slide with auxiliary slide removed. Fig. 10 is an upper side plan of the auxiliary slide detached. Fig. 11 shows the adjusting-screw and its spindle. Fig. 12 is a transverse section on the line 12 12 in Fig. 6. Fig. 13 shows the punch-carrying cam in side elevation and plan. Fig. 14 is a perspective view of the box G. Fig. 15 is a perspective view of the oscillating cam Q. Fig. 16 is an enlarged horizontal section through the die, showing the operation of detaching the ejected mass from the punch and dropping it upon the molding-wheel. Fig. 17 is a vertical section through the axis of the die, showing the same operation. Fig. 18 is a plan of the molding-wheel, showing its removable ring detached. Fig. 19 includes four radial cross-sections through the molding-wheel rim and molding-shoe, the sections being cut in four successive positions of the pill in course of being molded. Fig. 20 is a fragmentary section through the molding wheel and shoe in the plane of rotation of the wheel. Fig. 21 is a fragmentary vertical section of the bottom portion of the mixer-chamber, showing the means of attaching the two parts thereof.

I will first describe that part of the machine constituting the mixer for working the medicinal or other compound into paste.

Let A designate a mixing-mill in the nature of a pug-mill, comprising a mixer-chamber and stirring-arms working therein. This mill is constructed with a cylindrical or conical vessel or shell B, within which revolves a tubular shaft C, carrying stirring arms or blades $c\ c$, and at its bottom a wiper $d$, which revolves over the bottom of the plate $e$ of the vessel. The vessel B is preferably made with double walls, constituting between them a water-jacket $f$, into which water or steam may be admitted for raising or lowering the temperature, in order to keep the compound at the proper temperature for working it most effectively. For this purpose water is admitted from a reservoir F through a pipe $f'$ into the upper part of the water-jacket, and it passes back from the lower part thereof through a pipe $f^2$ to the reservoir, or it may be turned off through a cock $f^3$ by opening this and closing the cock $f^4$; or water may be admitted from the city mains to cool the vessel, entering it at $f^3$, flowing upwardly around the water-jacket, and passing out therefrom from the pipe $f'$ to the reservoir F. This reservoir may be provided with any suitable means for heating or cooling the water, and is preferably furnished with a thermometer on its exterior, as shown.

I preferably construct the water jacket and vessel B with a ring $a$ beneath and another $a'$ above, between which the outer and inner walls of the jacket are fastened and suitably packed. By preference I make the vessel B detachable from the bottom of the mixer in order that it may be readily lifted off. To this end the bottom ring $a$ is made distinct from the bottom B' of the mixer, the latter being formed with a ring or annular flange $b$, projecting upwardly and locked to the ring $a$ by interengaging grooves and ribs or bayonet-joints or other similar fastenings, so that by turning the vessel B in one direction its ribs or fastenings shall be disengaged from those on the bottom B', and it may then be lifted off. The best fastening for this purpose consists of segmental ribs formed on the exterior of the flange $b$ and on the interior of the lower portion of the ring $a$, which fits over the flange $b$, these ribs being slightly inclined, so as to wedge together as the vessel B is turned. This construction is shown best in Fig. 21. By preference I make the inner wall of the mixing-chamber conical, as shown, although it may be cylindrical. I also apply to the inner wall a spiral rib $g$, the pitch of which is such relatively to the direction of motion of the mixer-shaft C that its tendency is to thrust the material downward. The stirring-blades $c\ c$ are also pitched in such direction that they have likewise a tendency to thrust the material downward. Close to the bottom of the vessel is formed at one side an opening $h$, Fig. 5, closed by a door $h'$, which is pressed to its seat elastically by a spring $h^2$, adjusted by a screw $h^3$. This door constitutes a relief-gate, which may be set to any desired pressure, so that it will open and let out the excess of material whenever that pressure is exceeded.

The mixing-shaft C is fastened on a vertical mill-shaft D, which passes through or into it and which extends beneath the mixer and is geared by miter-gears to a driving-shaft E, driven by belt-pulleys E' or otherwise. To prevent the material under treatment working out around the shaft D, where it passes through the bottom of the mixer, the bottom plate $e$ of the latter is formed with an upwardly-projecting portion $e'$, constituting a raised boss, through which the shaft D passes, Fig. 7. The bottom of the mixer-chamber is formed with a recess, from which the compound is ejected. It is made with a flat plate $e$, which is of the shape shown best in Fig. 7, forming at one side a downwardly-inclined recess or channel $i$, which sweeps around for about a quarter of a circle, continually descending until at its deepest portion it passes beneath a bridge-plate $j$, which is let into the bottom plate, so that its upper surface is flush with the upper surface of the plate $e$. From this lowermost portion the channel rises at $i'$ until on completing about a half-revolution, as shown in Fig. 5, it regains the normal level of the plate $e$. The tendency of the inclined mixer-blades $c$ and of the spiral rib $g$ is to force the material continually downward, so that it is packed into the depressed channel $i$ and forced under the bridge $j$. This action is rendered more positive by the wiper $d$, which is placed at the bottom of the mixer, so that it moves around close against the plate $e$. This wiper is formed with perpendicular faces at its hub, while the faces on the advancing sides of its two arms are warped or inclined, twisting from a vertical at the hub to a considerable downward incline at the outer ends of the arms. The wiper is preferably made of the shape shown in plan in Fig. 5, with its arms curved outwardly and backwardly from the hub, so that their inclined front edges serve not only to press the material downwardly, but to thrust it outwardly, while the extreme end portions of the arms, being those which pass over the channels $i\ i'$, are made substantially radial, so that they exert only a downward tendency. The action of the wiper is thus to thrust the material outwardly toward the periphery of the bottom plate and downwardly to pack it into the channel $i$, and by reason of the rotary motion of the stirring-arms and wiper the material is continually urged forward, and as it is thrust down into the channel it is caused to flow therein beneath the bridge $j$ and up the ascending portion $i'$ of the channel. The result is that in the space beneath the bridge there is a tightly-packed mass of pasty or doughy material, which is advanced or fed forward beneath the bridge at each passage of the wiper-arms.

The mechanism for forcing out measured quantities of material to be formed into pills acts upon the mass in the recess or space beneath the bridge $j$. This mechanism consists of a fixed die $k$ and a reciprocating punch $m$. The die is preferably screwed fast into the side wall of the chamber with its axis radially of the axis of rotation of the mixer. The reciprocating punch $m$ is mounted on a slide. (Shown detached in Fig. 8 and in inverted plan in Fig. 9.) This slide M moves in slideways formed at the junction of the bottom plate of the mixer, and a box G fastened beneath the mixer, as shown best in Fig. 12. The slide M is reciprocated by suitable mechanism in order to thrust it forward and cause it to force a mass of material through the die $k$ and subsequently to retract it within the recess or channel $i$ until by the action of the wiper a fresh mass of material is forced into this channel, filling the space between the front of the punch and the die, so that upon the next forward movement of the punch it will force out a further mass of material.

The operative mechanism for driving the punch is constructed so that it may be thrown out of gear at will to leave the punch motionless and so that while in operation the throw of the punch may be adjusted. The punch moves forward to a certain invariable distance at each movement, but is retracted to varying distances, determined by its adjustment. The purpose of this adjustment is to cause the punch to force out a greater or lesser mass of material to be made into a pill, dependent upon the size of the pill to be made. By retracting the punch a greater distance a greater mass of material intervenes between the punch and die, so that when the punch is forced forward it ejects a greater mass of material from the channel through the die. By thus adjusting the extent of retraction of the punch the quantity of material ejected may be accurately gaged. This adjustment is made while the machine is running, in order that the supply of material may be accurately gaged to the requirements of the pill-rolling mechanism, hereinafter to be described, without stopping the operation of the latter.

I will now describe the specific and preferred means provided for operating the punch, it being understood that these means may be greatly varied. On the shaft D is loosely mounted a double cam H, which may freely slide up and down on the shaft. This cam is shown detached in Fig. 13. It consists of two pairs of cam-arms $l\,l$ and $n\,n$, the upper ones $l\,l$ acting against the slide M to thrust it forward, while the lower ones $n\,n$ act against an auxiliary slide M', fastened adjustably to the slide M, to thrust the latter backward. This action takes place when the cam H is coupled to the shaft D, so that it revolves with it. This coupling is effected by any suitable means—as, for example, by a pin $l'$, projecting upwardly from the cam and engaged by a pin $c'$, projecting radially from the shaft D. The abutting faces of these pins constitute reciprocally engaging shoulders on the cam and shaft respectively. To stop the rotation of the cam it is simply dropped down until these pins disengage, the same movement dropping the cam-arms $n$ below the engaging-face of the auxiliary slide M'. The upper cam-arms act against the face $m'$ of the slide M to thrust it forward, so that they move the punch forward always an invariable distance. The lower cam-arms $n$ act against the face or stop $n'$ of the auxiliary slide M', so that this auxiliary slide is thrust back always a certain distance; but by adjusting its position relatively to the slide M the distance to which the latter, and consequently the punch $m$, is thrust back may be varied. This auxiliary slide M', which thus constitutes an adjustable stop on the slide M, is mounted beneath the slide M and slides relatively thereto in slideways or dovetails formed thereon, as shown in Fig. 12. Its upper face is cut with a half female screw-thread, Fig. 10, which is engaged by the male thread on an adjusting-screw N, Fig. 11, which is confined between the parts M M', turning in a recess in M (shown at $o$ in Fig. 9) and engaged by shoulders thereon to prevent its longitudinal displacement relatively thereto. By turning this screw N the slide M' is propelled forward or back relatively to the slide M, so that the distance between the thrust-shoulders $m'$ and $n'$ is varied. As the adjusting-screw N reciprocates with the slide M, this adjustment could be made only when the parts were at rest; but to enable it to be made while the machine is running I provide an adjusting-spindle P, Fig. 11, which engages the shank N' of the screw N in such manner that the two must turn together, although the shank N' may reciprocate independently of the spindle P, the latter being mounted in a stationary bearing at $p$, formed in the rearward extension $e^2$ of the floor-piece $e$. (Shown in Fig. 7.) The most convenient construction is to mill a slit in the spindle P and flatten the shank N' to fit this slit, as shown in Fig. 11. The milled head P' being removed, the spindle P has its journal $p'$ thrust into the bearing $p$, after which the milled head is fastened to its outer end.

The means for raising and lowering the cam H in order to throw it into or out of gear will now be described. Where the shaft D passes through the box G, the latter is formed on its inner side with a raised boss $q$, and this boss is cut, as shown in Fig. 14, to form spiral inclines terminating in flat upper faces. These spiral inclines are thus formed on a fixed part of the apparatus. Over this boss is mounted a ring Q, having a projecting handle Q', Fig. 15, and this ring is formed on its under side with similar spiral inclines and flat faces fitting those on the boss. The ring is capable of being oscillated by the handle Q', so that these bottom inclines are formed on an oscillating part. In one position the ring Q descends to the bottom of the inclines on the boss, while by oscillating it to another position it rides up these inclines and assumes a higher level, its flat faces seating on those of the boss, so that it has a solid bearing. The handle Q' projects beyond the end of the box G, working in an inclined slot therein. This ring Q comes directly beneath the cam H, and when it is adjusted to the higher level just described it holds this cam up, so that its driving-pin is engaged by the pin on the shaft D, as shown in Fig. 6; but by vibrating the handle Q' to cause the ring Q to ride down the inclines on the boss $q$ the support for the cam H is removed and the latter drops down sufficiently to disengage these pins, so that it ceases to be driven by the shaft. Hence in one position of the handle Q' the cam is in operative engagement and the punch $m$ is being driven to force out successive quantities of the mixture for the pills, while in the opposite position of the handle the driving-cam is disengaged and the punch remains stationary.

In order to prevent the escape of the plastic mass through the die during the time that the punch is retracted, as might occur in treating a mass reduced to a thin paste, I provide a sliding gate R, which moves across the opening to the die. This gate is preferably operated from beneath the mixer and is in the form of a thin plate passing up through an opening in the bottom B' thereof. Its lower end is also connected to a rock-lever R', suitably fulcrumed, which receives vibratory motion from the reciprocation of the slide M. As the slide moves back toward the end of its retractile movement it tilts the lever R' to thrust up the gate R and close the die-opening, while upon the first forward movement of the punch the lever is tilted in the opposite direction to retract the gate R and uncover the die-opening. In the construction shown the tail of the lever R' is acted upon by the transverse portion $m'$ of the slide M to press it down and thrust up the plate when the punch is retracted, while upon its forward movement it releases the tail and the lever is then tilted by the tension of a spring $r$ to open the gate. This gate R and the means for operating it may ordinarily be omitted, as its use is unnecessary with material in the form of a thick paste or dough, and not strictly necessary even for a thin paste.

I will now describe the means for converting the ejected portions of the paste into pills. These ejected portions are in the form of short cylinders, whereas for most purposes it is desirable to convert them into spheres. This operation is performed in general by rolling the mass between opposite surfaces formed as half-round grooves.

On the driving-shaft E is mounted freely a molding-wheel J, which may be clutched to the shaft in one position by a clutch I, sliding on a feather on the shaft. The wheel J has a prolonged hub $s$, which enters the bearing in the frame and has annular grooves in its exterior which are engaged by ribs in the bearing, which ribs may be formed in the Babbitt metal thereof. By means of this construction the molding-wheel J is kept in place independently of being clutched to the shaft. The wheel J is formed with a thin projecting flange $r$ on one side, which flange comes close against the exterior of the die $k$ as the wheel revolves. This flange is cut away to form two diametrically-opposite spaces, as shown at $r^2$ in Fig. 3, in order, while these spaces are passing the die, to uncover the latter for a sufficient duration to enable the punch to act and force out a quantity of the material. The material thus forced out is cut off or separated from the end of the punch, upon which it would otherwise be liable to adhere, by a knife-edge $r^3$, formed at the advancing end of each section of the flange $r$. This cutting-off operation is clearly shown in Figs. 16 and 17. The cut off mass is received in the channel or groove in the periphery of the wheel. This channel is preferably formed in a ring J', removable from the wheel J in the manner shown in Fig. 18, in order that for different sizes of pills different rings may be used having different sizes of grooves or channels in their peripheries.

Close against the exterior of the molding-wheel J and extending parallel with its rim for about one-fourth of a revolution is arranged an arc-shaped molding bar or shoe K, having a groove in its inner face toward the wheel. It is adjustable toward and from the wheel by an adjusting-screw L, Fig. 3, engaging a bracket on the fixed frame of the machine and operating a slide L', on which the shoe K is rigidly mounted.

To admit of readily changing the machine for different sizes of pills, the shoe K is provided with a removable lining-strip K', in which the groove is formed and which is connected to it by dovetails $t\ t$, so that it may be slipped out and substituted by a lining-piece having different-shaped grooves. The mass of composition forced out by the punch and cut off by the flange of the mold-wheel is immediately carried by the groove thereof under the upper end of the molding-shoe K and is rolled between the groove in the stationary shoe and the groove in the revolving wheel until it emerges from the lower end of the shoe, whereupon it drops out and falls into an inclined chute S, down which it rolls into any suitable receptacle. To prevent the pills sticking to the wheel, fingers $t'$ of wire are applied to the chute and project against the groove in the wheel to insure the detachment of the pills. The mass of material is formed by the action of the die and punch into a nearly perfect cylinder, which is received upon the groove in the molding-wheel, where this groove is cylindrical, or approximately so, and is carried thereby into the entering end of the shoe, which also has its groove at this point of nearly cylindrical form. The grooves in the wheel and shoe gradually change from the cylindrical form with nearly square corners to a semicircular cross-section, so that the mass in being rolled between these grooves and carried along therein has its corners gradually forced in and is swelled out at its middle until it becomes a substantially perfect sphere, in which condition it is discharged from the outlet end of the shoe. This combination of the grooves may be readily understood by referring to the succession of cross-sections thereof shown in Fig. 19, where the cross-section 1 is cut at the entrance to the two grooves, 2 is cut a little farther on, 3 still farther on, and 4 at the point where the pill emerges from between the grooves. It will be understood that by reason of the shoe K being stationary and the wheel J revolving the groove in the shoe merges from square to round in extending from left to right, while the grooves in the wheel merge from square to round in extending from right to left. By means of the adjusting device the shoe may be adjusted to exactly the proper distance from the wheel in order that in rolling the pill the latter shall have exactly the correct amount of space between the two grooves to accommodate its mass from the instant when it enters between them as a short cylinder until it leaves them as a sphere.

Fig. 20 is a fragmentary sectional view through the two grooves, showing the pill in the process of being rolled.

The chute S is of peculiar construction, in order to facilitate the separation of any imperfect pills, being inclined to such an angle that a perfect sphere will roll down its inclined surface, while an irregular or imperfect sphere or one having flattened spaces or protuberances upon it will not find the incline sufficient to enable it to roll and will come to rest upon the surface of the chute. To adjust the chute to this inclination it is provided with means for raising and lowering its discharge end. This means may consist of an adjusting-screw, as shown at $u$ in Fig. 1. To facilitate the removal of the imperfect pills thus separated, I construct the chute S with a dividing partition $u'$, Fig. 5, terminating at its upper end in a swinging gate $u^2$. This gate is swung to one side, so as to divert all the pills into the passage on one side of the partition until sufficient imperfect pills have there accumulated, whereupon the gate is swung over to that side in order to direct the stream of pills to the passage on the other side of the partition, while the imperfect pills are being removed from the side in which they have first accumulated. The imperfect pills will ordinarily be made only when first starting the machine and before it has been brought to the correct adjustment.

In order to prevent the pills sticking to the molding-wheel J and shoe K and to the chute S, I provide means for sifting a fine powder against the surface of the wheel in front of the die, so that the mass of material forced out of the die will be instantly covered with powder, which will keep the moist or sticky mass out of contact with the surfaces of the grooves in the wheel and shoe. The powder used for this purpose will be any powder ordinarily used for coating pills—such, for example, as licorice powder or sugar-of-milk. The powder for this purpose is placed in a hopper T, the discharge-spout of which enters within a rotary screen T', constructed, as usual, of cylindrical wire-cloth open at both ends and supported on a revolving shaft. This shaft projects at its lower end over the mill-shaft D and is furnished with a wheel or roller $v$, which rests upon a disk $v'$, carried by the upper end of the mill-shaft, so that the rotation thereof will impart rotary movement to the shaft of the screen T'. This shaft has a bearing at its upper end within the hopper T, and at its lower end is guided in a forked bearing $v^2$, projecting up from the mixer. The screen T' is inclined sufficiently so that any coarse particles which cannot pass through the screen are carried down and deposited in the mixer A. The fine powder will sift through the screen and fall in a chute $T^2$, by which it is directed into the powder-mixer U, consisting of a suitable vessel, preferably of glass, within which rotates a stirrer U', consisting of wire arms or rods twisted into any suitable irregular shape, in order that the different portions thereof by revolving in circles of different radii shall serve to agitate as nearly as possible every portion of the powder deposited in the vessel. The stirrer U' is mounted on the upper end of a short shaft $w$, the lower end of which carries a friction-roller $w'$, which rolls against the side of the rim of the molding-wheel J, so that the stirrer is only driven when this wheel is driven. The shaft $w$ turns in a fixed casting $U^2$, the upper portion of which is disk-shaped and forms a support and bottom for the vessel U, the casting being supported by being bolted to the bottom or fixed part of the mixer A, as shown in Fig. 5. The leakage of powder down around the shaft $w$ is prevented by forming the casting $U^2$ with a raised boss in its middle, through which the shaft passes, and by fitting on the shaft a cap $w^2$, which covers over this boss, and to which the rods of the stirrer are secured. Through the bottom piece $U^2$ an outlet-hole $x$ is formed, through which a stream of powder flows and falls on the rim of the wheel J, in line with the die $k$, so that when the punch forces out a mass of material through the die this mass enters under the stream of powder and is covered therewith. In order to cause the powder to pass out through this opening, the arms of the stirrer are constructed at their lower ends to sweep over it, so that they keep the opening clear, and each time they pass out they sweep a mass of powder into the opening. The volume of the stream of powder falling through the opening is determined by an adjusting-screw $x'$. (Shown best in Fig. 5.) The rapidity of the feed of powder to the powder-mixer may be determined by tilting the hopper T and screen T' to different angles. For this purpose the hopper is mounted on an adjustable frame $y$, which may be clamped at different heights to a standard $y'$.

The frame-work of the machine consists in the construction shown of a base W, from which rise two upright frames W' and $W^2$, which are formed with bearings for the power-shaft E. The frame $W^2$ has bolted to its upper side the box G, to which in turn is bolted the bottom part of the mixer A. The miter-gears for communicating motion from shaft E to shaft D are inclosed in a box $W^3$, carried by the upright frame $W^2$. On the base-plate are placed a receptacle V for receiving any excess of powder that falls from the wheel J and a receptacle V' for receiving the finished pills from the chute S. A third receptacle $V^2$ may be provided for receiving material mixed in the mixer and discharged without being made into pills.

The operation of the machine may now be described. The ingredients of which the pills are to be composed are placed in proper proportions in the mixer A, including a sufficient amount of liquid to form the whole into a stiff plastic mass of suitable consistency. The molding-wheel J is first disengaged from the shaft E by withdrawing the clutch I. The machine being then started, the mixer-shaft C is alone driven, the handle Q' being turned to such position that the cams H are rendered inactive. The operation of the machine under these conditions effects a thorough mixing of the ingredients, the spiral knives of the mixer cutting the mass and pressing it downward upon the wiper. The gate $h'$ at the front is thrown open, and the mass as it is mixed and forced to the bottom passes out through the opening $h$ and falls into the receptacle $V^2$ beneath, from which it may be returned to the top of the mixer. The machine is operated in this manner whenever it is desired to thoroughly mix or incorporate the material before commencing the operation of forming the pills. When the material has been thoroughly mixed and it is desired to commence making it into pills, the gate $h'$ is closed and the spring $h^2$ is set against it with a pressure to hold it close against the ordinary pressure within the cylinder, while at the same time relieving any excessive pressure by permitting a small quantity of the material to force its way out through the gate. The mold-wheel J is next clutched to the shaft E by means of the clutch I, so that this wheel revolves with the shaft. Simultaneously therewith or at any time thereafter the lever Q' is shifted to bring the cam H into action and drive the punch $m$, whereupon the pill-forming commences. Coincidently with the starting of the wheel J the stirrer in the powder-mixer is set into operation, and powder is supplied to it by placing it in the hopper T and setting the revolving screen T' to work by placing it in its slotted bearings, so that it is caused to revolve. The downward action of the spiral blades of the mixer and most particularly of the spiral surfaces of the wiper $d$ packs the thick pasty mass down into the channel $i$ and causes it to travel forward therethrough in an intermittent stream beneath the bridge $j$. Thus a continually renewed and changing mass of material is provided beneath the bridge for the punch to cut from, while the bridge serves the purpose of relieving the mass beneath it from the downward pressure of the wiper. By this means there is but little tendency to force the material out from the die when the punch is retracted, even though the die were not closed by either the rim $r$ of the mold-wheel or by the gate R. However much the pressure may be varied from above the density of the mass under the bridge remains substantially uniform, thus allowing the punch to force through the die a given quantity at each movement. During the greater part of a half-revolution of the driving-shaft the upper end of the die is closed by the rim $r$ of the mold-wheel, which revolves close against the face of the die. At the instant that the opening in this rim reaches the die the punch begins to operate and forces out a short cylinder of the mass, which will ordinarily remain attached to the end of the punch until the knife-edge $r^3$ reaches the punch, whereupon it serves to shear off the adherent mass from the punch. As this knife is beveled on the side toward the punch, it has also the effect of pressing the punch back or starting it on its return movement. When, however, the punch is set to full-stroke, the cam-arm $n$ of the cam H commences to act at this instant and forces the punch backward simultaneously with its engagement with the incline on the knife-edge. As the mass of material is forced out it enters under the stream of powder falling from the mixer U and is covered with powder, and as it is cut off it drops into the groove of the wheel, which also contains powder. It is then instantly carried by the wheel under the shoe K, and on emerging therefrom it is delivered into the chute S as a perfectly-spherical and properly-coated pill. To make perfect pills the length of the cylinder of material forced out through the die must correspond in a certain proportion with its diameter and with the diameter of the sphere, and these relative proportions vary with different compositions and the conditions under which they are worked. To adjust the mass accurately to the requisite conditions, the diameter of the cylinders remaining uniform, their length is made variable by adjusting the stroke of the punch. As it is not practicable to stop the machine for this adjustment, I provide for its control while the machine is in operation by the means hereinbefore described. In starting the pill-making mechanism the regulating-screw N should be turned by its milled head P' back until the punch scarcely leaves the die in its backward movement. In this condition the first pills made are almost certain to be imperfect; but while the machine is running the screw should be turned slowly forward until gradually the pills are better, until when the correct adjustment is secured the pills emerge as perfect spheres. The imperfect pills first made and until this adjustment is attained are thrown back into the mixer A to be made over. In case the conditions should vary during the operation, a slight turning of the regulating-screw in the proper direction will correct the working of the machine. The unmixed materials may be deposited in the mixer A and will ordinarily become thoroughly compounded during their descent and before the mass reaches the die, thus making the operation continuous. The punch acting to force the mass of homogeneous material out from a recess in which it is packed with a given pressure constitutes a means for exactly measuring the quantity that is expelled for forming each pill. During its retractile stroke as it passes inwardly from the die the mass of material is forced past it, thereby closing up the cavity left by its withdrawal and filling the space in front of the punch with a compact mass of fresh material. This is caused by the sweeping movement of the wiper as it approaches the bridge, occurring toward the end of the retractile stroke of the punch, while the next forward stroke of the punch is effected during the passage of the wiper over the bridge, while the material beneath the bridge is relieved of the downward thrust of the wiper. For making different sizes of pills the molding-ring J' on the wheel J and the face-plate K' on the shoe K, and also, if necessary, the die k and punch m, are removed and substituted by others of the required size.

The parts of this machine are few in number and easily made and the machine is easily operated, its capacity being limited only by that of the operator, who can easily attend to six machines, making three hundred pounds of material per day.

Pills, cakes, or tablets of other form than spherical may be made on this machine by varying the shape of the grooves in the wheel J and shoe K, by which any rotatively-generated solid may be produced.

I claim as my invention the following-defined novel features or combinations, substantially as hereinbefore specified, namely:

1. A mixer-chamber formed with a recess consisting of a channel inclined gradually to a certain depth and returning by an incline to the outline of the chamber, means for forcing a pasty mass of material into and through said recess, a die or opening therefrom, and a punch working to force a quantity of material from said recess out through said die.

2. A mixer-chamber formed with a recess consisting of a channel inclined gradually to a certain depth and returning by a gradual incline to the outline of the chamber, a wiper sweeping over said recess and adapted to force a pasty mass of material thereinto, a die or opening therefrom, and a punch working to force a quantity of material from said recess out through said die.

3. A mixer-chamber formed with a recess consisting of a gradually-descending channel, a bridge-plate crossing said channel, a wiper sweeping over the channel and adapted to force a pasty mass of material into said recess, a die or opening therefrom beneath said bridge, and a punch working beneath said bridge to force a quantity of material from said recess out through said die.

4. A mixer-chamber formed with a recess consisting of a gradually-descending channel, a bridge crossing said channel, a wiper sweeping over said channel, a die or opening therefrom beneath said bridge, and a punch working to force a quantity of material from said recess out through said die, and driving mechanism connected to said wiper and punch for retracting the punch as the wiper approaches the bridge and protruding the punch as the wiper passes over said bridge.

5. The combination, with a mixer-chamber, of a punch for ejecting material therefrom, a slide carrying said punch, a revolving shaft having a cam projection acting against said slide to force it forward, and a cam projection for retracting said slide, and an adjustable stop carried by said slide against which said cam projection acts.

6. The combination, with a mixer-chamber, of a punch for ejecting material therefrom, a reciprocating slide carrying said punch, an auxiliary slide carried thereby and adjustable relatively thereto, a screw engaging said slides, respectively, for adjusting them relatively, and a revolving shaft having cam projections acting against said slide to protrude the punch and against the auxiliary slide to retract the punch.

7. The combination of a punch for ejecting measured quantities of material, a slide carrying said punch, an auxiliary slide adjustable thereon, a shaft having cam projections engaging said slide for protruding the punch and said auxiliary slide for retracting it, an adjusting-screw engaging said slides respectively, and an adjusting-spindle for turning said screw, having sliding connection therewith, whereby the adjustment of the screw may be effected during the reciprocation of the slide.

8. The combination, with a mixer-chamber, of a punch for ejecting material therefrom, mechanism for reciprocating said punch, and means for disconnecting said mechanism at will in order to stop said punch.

9. The combination of a mixer-chamber having rotating mixing-blades, a shaft carrying said blades, a punch for ejecting material from said chamber, mechanism driven from said shaft for reciprocating said punch, and means for disconnecting said mechanism in order to stop said punch without stopping the mixer.

10. The combination of a mixer-chamber, a punch for ejecting material therefrom, a shaft having a cam for reciprocating said punch, and means for uncoupling said cam from said shaft at will, whereby said punch may be stopped.

11. The combination of a mixer-chamber, a punch for ejecting material therefrom, a driving-shaft, a cam on said shaft for reciprocating said punch, reciprocal engaging-shoulders on said cam and shaft, and means for sliding said cam along said shaft to engage or disengage said shoulders.

12. The combination of a mixer-chamber, a punch for ejecting material therefrom, a revolving shaft, a cam on said shaft for reciprocating said punch, reciprocal engaging-shoulders on said shaft and cam, arranged to engage when the cam is elevated and to be disengaged when the cam is depressed, spiral inclines formed on a fixed part of the apparatus, and an oscillating part formed with inclines working against said fixed part and movable against said cam, whereby as it is oscillated in one direction it lifts said cam into engagement and in the other direction it drops said cam out of engagement with said shaft.

13. The combination of a mixer-chamber, a die or opening therefrom, a punch for forcing a quantity of material therefrom through said die, means for reciprocating said punch, a sliding gate movable across said die to close its opening, and means for reciprocating said gate adapted to move it across said opening when the punch is retracted.

14. The combination of a mixer-chamber, a die or opening therefrom, a punch for forcing a quantity of material therefrom through said die, a reciprocating slide carrying said punch, a sliding gate movable across said die to close its opening, and a lever interposed between said gate and said slide and arranged to be vibrated to move said gate across said opening when the slide is retracted.

15. A mixer for plastic material, consisting of a chamber formed with an outlet-opening at its lower part, an upright shaft revolving in said chamber and having spirally-inclined mixing-arms, a door for closing said opening, and an adjustable spring for holding said door closed, whereby an excessive pressure within the mixer will be relieved by an escape of material therefrom through said door.

16. A mixer-chamber constructed with a fixed bottom, a removable upper vessel, and means for uniting the two detachably together, whereby the upper vessel may be removed for cleaning or repairs.

17. A mixer-chamber constructed with a fixed bottom B', having a vertical cylindrical flange b, a removable upper vessel B, having a bottom flange a, and means for detachably uniting said parts, consisting of reciprocally-engaging wedging ribs and grooves formed on said flanges, respectively.

18. In a pill-machine, the combination, as a means for molding pills, of a molding-wheel having a groove in its rim, and an arc-shaped molding-shoe arranged parallel with the rim of said wheel and having a coinciding groove in its inner face, said wheel constructed with a removable ring, in which said groove is formed, whereby in order to make pills of different sizes or shapes said ring may be replaced by one having a differently sized or shaped groove.

19. In a pill-machine, the combination, as a means for molding-pills, of a molding-wheel having a groove in its rim, and an arc-shaped molding-shoe arranged parallel with the rim of said wheel and having a coinciding groove in its inner face, said shoe constructed with its inner portion in which said groove is formed removable, whereby in order to make pills of different sizes or shapes said inner portion may be replaced by one having a differently sized or shaped groove.

20. In a pill-machine, the combination, as a means for molding pills, of a molding-wheel having a groove in its rim, an arc-shaped molding-shoe arranged parallel with the rim of said wheel and having a coinciding groove in its inner face, and an adjusting device for moving said shoe toward or from said wheel to adjust it to the correct distance for properly rolling the pills.

21. In a pill-machine, the combination of a vessel for holding the plastic material, a die or opening therefrom, means for expelling the material through said die, and a wheel revolving with its rim close against said die, so as to close its opening and having its rim cut away to admit of the expulsion of the material from the die during the time that such cut-away portion is passing the die.

22. In a pill-machine, the combination of a vessel for holding the plastic material, a die or opening therefrom, means for expelling the material through said die, and a wheel revolving with its rim close against said die, so as to close its opening and having its rim cut away to admit of the expulsion of the material from the die while such cut-away portion is passing the die and the advancing edge of the rim at the end of said cut-away portion formed as a knife to cut off the material expelled from said die.

23. In a pill-machine, the combination of a vessel for holding the plastic material, a die or opening therefrom, means for expelling the material through said die, and a revolving wheel carrying a knife past said die to cut off after each ejection of material therefrom the mass of ejected material.

24. In a pill-machine, the combination of a vessel for holding the plastic material, a die or opening therefrom, a reciprocating punch for periodically expelling measured quantities of the material through said die, and a revolving wheel carrying a knife past said die and timed relatively to the movements of said punch to cause said knife at each projection of the punch to shear across the end thereof and cut off the mass of ejected material therefrom.

25. In a pill-machine, the combination of a vessel for holding the plastic material, a die or opening therefrom, a punch for expelling material through said die, a revolving cam for reciprocating said punch, and a revolving wheel carrying a knife past said die which is beveled on the side toward said die and said wheel timed relatively to the movements of said punch to cause its knife at each projection of the punch to shear across the end thereof and by the impingement of its beveled side thereagainst to start the punch back on its retractile stroke.

26. In a pill-machine, the combination of a vessel for holding the plastic material, a die or opening therefrom, means for expelling the material through said die, a wheel revolving with its rim close against said die and having its rim cut away to admit of the expulsion of the material from the die while such cut-away portion is passing the die, a revolving shaft on which said wheel is loosely mounted, and a clutch for uniting the wheel to said shaft at will.

27. In a pill-machine, the combination of a vessel for holding the plastic material, a die or opening therefrom, means for expelling the material through said die, and means for supplying a stream of powder at the exit from said die, whereby the plastic material is covered with powder, and thereby prevented from adhering to other surfaces during subsequent manipulations.

28. In a pill-machine, the combination of a vessel for holding the plastic compound, a die or opening therefrom, means for expelling the compound through said die, a molding-wheel arranged to receive the expelled compound, a molding-shoe between which and the wheel the compound is rolled to form it into a pill, and means for supplying a stream of powder at the exit from said die, whereby the plastic compound is covered with powder.

29. In a pill-machine, the combination of a revolving molding-wheel, a clutch for connecting it at will to the source of power, and a powder-sprinkler driven from said wheel, whereby when the molding-wheel is stopped said powder-sprinkler is also stopped and arrests the flow of powder.

30. In a pill-machine, the combination, to form a powder-sprinkler, of a powder-vessel having an outlet-opening therefrom, a revolving stirrer therein for agitating the powder, consisting of a succession of stirring-rods, mounted to move in circular paths of different diameters, and means for driving said stirrer.

31. The combination of a powder-hopper, a revolving screen into which powder is fed therefrom, a chute receiving the powder falling through said screen, a powder-vessel into which the powder is delivered from said chute, a powder-outlet from said vessel, and a stirrer in said vessel for agitating the powder and causing it to flow out through said outlet.

32. The combination of a mixer, the revolving shaft thereof carrying a disk, a revolving screen having a friction-wheel at one end of its shaft resting on and driven by said disk, a powder-vessel arranged to receive the powder sifted through said screen, and a stirrer in said vessel for agitating the powder therein and expelling it from the outlet thereof.

33. The combination of a mixer, a powder-vessel, a powder-hopper, a revolving screen into which powder is fed from said hopper, arranged to discharge coarse particles from its lower end into said mixer, and a chute receiving the powder sifted through said screen and conducting it into said powder-vessel.

34. The combination of a mixer, the revolving shaft thereof carrying a disk, a revolving screen having a friction-wheel at one end of its shaft resting on and driven by said disk, a powder-vessel receiving the powder sifted through said screen, and an adjustable frame for supporting the receiving end of said screen adjustable to varying heights to vary the inclination of the screen.

35. In a pill-machine, the combination, to form a powder-sprinkler, of a powder-vessel having an outlet opening therefrom, an adjusting device for varying the area of said opening, and a stirrer in said vessel for agitating the powder and causing it to flow out through said opening.

36. The combination, with a pill-machine, of a chute arranged to receive the pills as they are delivered therefrom, and means for adjusting said chute to varying angles, whereby it serves to separate the imperfect from the perfect pills.

37. The combination, with a pill-machine, of a chute arranged to receive the pills as they are delivered therefrom, constructed with a dividing partition, and an adjustable gate movable to direct the pills to either side of said partition.

In witness whereof I have hereunto signed my name in the presence of two subscribing witnesses.

CHESTER A. WELLER.

Witnesses:
CHARLES WESLEY,
JOHN GIBNEY.